(12) United States Patent
Nebel et al.

(10) Patent No.: US 8,398,115 B2
(45) Date of Patent: Mar. 19, 2013

(54) VEHICLE STEERING WHEEL

(75) Inventors: Raimund Nebel, Obermeitingen (DE); Jürgen Mackensen, Dachau (DE); Oliver Adolph, München (DE)

(73) Assignee: Autoliv Development AB, Vargarda (SE)

( * ) Notice: Subject to any disclaimer, the term of this patent is extended or adjusted under 35 U.S.C. 154(b) by 116 days.

(21) Appl. No.: 13/000,058

(22) PCT Filed: Jun. 25, 2009

(86) PCT No.: PCT/EP2009/004588
§ 371 (c)(1), (2), (4) Date: Dec. 20, 2010

(87) PCT Pub. No.: WO2009/156153
PCT Pub. Date: Dec. 30, 2009

(65) Prior Publication Data
US 2011/0101650 A1 May 5, 2011

(30) Foreign Application Priority Data
Jun. 25, 2008 (DE) .......... 10 2008 029 770

(51) Int. Cl.
*B60R 21/203* (2006.01)
*H01H 9/00* (2006.01)

(52) U.S. Cl. .......... 280/731; 74/552; 200/61.54

(58) Field of Classification Search .......... 74/552; 200/61.54, 61.55; 280/728.1, 728.2, 731
See application file for complete search history.

(56) References Cited

U.S. PATENT DOCUMENTS

| | | | | |
|---|---|---|---|---|
| 2,025,977 A | * | 12/1935 | Getty | 200/61.57 |
| 3,525,536 A | * | 8/1970 | Pruneski | 280/731 |
| 4,581,508 A | * | 4/1986 | Shanklin et al. | 200/61.54 |
| 6,365,853 B1 | * | 4/2002 | Frisch | 200/61.55 |
| 6,457,379 B1 | * | 10/2002 | Mirone | 74/552 |
| 6,491,319 B2 | * | 12/2002 | Bonn | 280/731 |
| 6,675,675 B1 | * | 1/2004 | Sauer et al. | 74/552 |
| 6,688,638 B2 | * | 2/2004 | Schutz | 280/728.2 |
| 6,830,263 B2 | * | 12/2004 | Xu et al. | 280/731 |
| 7,111,867 B2 | * | 9/2006 | Heindl | 280/731 |

(Continued)

FOREIGN PATENT DOCUMENTS

DE  199 08 385 A1  10/2000
DE  201 08 596 U1  10/2001

(Continued)

OTHER PUBLICATIONS

PCT/EP2009/004588—International Search Report—Sep. 25, 2009.

*Primary Examiner* — Joseph Rocca
*Assistant Examiner* — Laura Freedman
(74) *Attorney, Agent, or Firm* — Brinks Hofer Gilson Lione (57) ABSTRACT

A vehicle steering wheel with a steering wheel body, a movable element held movably on the steering wheel body, which element can be pressed down against the force of a restoring element against the steering wheel body, and with a horn contact which is closed by pressing down of the element. An economical design for constructing the horn contact is created in that the horn contact has two cable cores (44a, 44b) which are held in a holding element (32), and that a contact element (36a, 36b) which is likewise held by the holding element (32) extends into each of the cable cores (44a, 44b). The two contact elements (32a, 32b) come into electrical contact with each other here by the pressing down of the movable element.

24 Claims, 8 Drawing Sheets

U.S. PATENT DOCUMENTS

| | | | |
|---|---|---|---|
| 7,126,073 B2 * | 10/2006 | McLauchlan | 200/530 |
| 7,348,508 B2 * | 3/2008 | Worrell | 200/61.54 |
| 7,533,897 B1 * | 5/2009 | Xu et al. | 280/728.2 |
| 7,547,042 B2 * | 6/2009 | Chapelain et al. | 280/731 |
| 8,087,691 B2 * | 1/2012 | Nebel et al. | 280/731 |
| 2005/0161308 A1 * | 7/2005 | Frisch | 200/61.54 |
| 2006/0016613 A1 | 1/2006 | McLauchlan | |

FOREIGN PATENT DOCUMENTS

| | | |
|---|---|---|
| DE | 20 2004 000 953 U1 | 5/2004 |
| EP | 1772314 A1 * | 4/2007 |
| EP | 1 772 314 B1 | 3/2008 |

* cited by examiner

VEHICLE STEERING WHEEL

CROSS REFERENCE TO RELATED APPLICATIONS

This application claims priority to German Patent Application No. 10 2008 029 770.4, filed Jun. 25, 2008 and PCT/EP2009/004588, filed Jun. 25, 2009.

TECHNICAL FIELD OF THE INVENTION

The invention relates to a vehicle steering wheel for motor vehicles.

BACKGROUND OF THE INVENTION

The vehicle steering wheel of almost every motor vehicle has a steering wheel body which is rigidly connected with the steering column, and at least one element which can be pressed down against the force of a return element against the steering wheel body, a horn contact being closed by the pressing down of this element.

In many cases, the movable element which can be pressed down is an airbag module or a part thereof. In the former case, the entire airbag module, i.e. an assembly substantially consisting of a housing, an airbag folded into the housing, a gas generator connected with the housing and a covering element spanning the housing, is held by means of springs and guide elements on the steering wheel body and a first horn contact is fastened to the housing, and a second horn contact is fastened to the steering wheel body, both horn contacts being connected with an electric lead.

In other designs, the airbag housing is rigidly connected with the steering wheel and only the covering element spanning the housing can be pressed down against the force of a return element—usually one or more springs—with a horn contact being closed as described above.

As disclosed by DE 20 2004 000 953 U1 it has become known to provide exclusively on the steering wheel side two wires which are to be brought into contact with each other on closing of the horn contact. For this, in the region in which the horn contact is situated, the steering wheel body has a recess through which the two wires extend which are to be brought in contact with each other causing actuation of the horn. The two wires, which are not insulated in the region of the recess, are respectively integral spring-elastic elements here, with the two wires at least partially overlapping each other. On pressing down of the movable element, a ram presses onto one of the two wire sections, so that the latter is pressed down and comes in contact with the second wire section. An advantage of this type of horn contact is that only one component, that is generally the vehicle steering wheel, requires electrical connections for the horn, whilst the element which is held movably on the steering wheel body, for example the airbag module, does not need to have any electrical connections for the horn. This has advantages in particular with regard to the simple installation of the airbag module. A disadvantage, however, is that the installation of the necessary wire sections in the steering wheel body is relatively laborious.

SUMMARY OF THE INVENTION

Proceeding herefrom, the present invention sets the problem of further developing a generic vehicle steering wheel such that its manufacture is simplified.

According to the invention, the horn contact has two cable cores which are held in a holding element. A separate contact element, which is likewise held by the holding element, extends into each of these cable cores. The two contact elements extend out of the holding element and come into electrical contact with each other on pressing down of the movable element.

The two cable cores are preferably stranded wires, for example copper stranded wires, which are part of an at least two-core cable. Such two-core cables are standard components and are very favourably priced. The holding element can also be a very simply constructed component made of plastic. The mounting of the cable cores in the holding element is mechanically simple and can, in particular, also take place outside the steering wheel, therefore an extensive pre-assembly is possible.

The invention will now be described in further detail by means of example embodiments with reference to figures, in which are shown.

BRIEF DESCRIPTION OF THE DRAWINGS

DETAILED DESCRIPTION OF PREFERRED EMBODIMENTS

Figure 1:
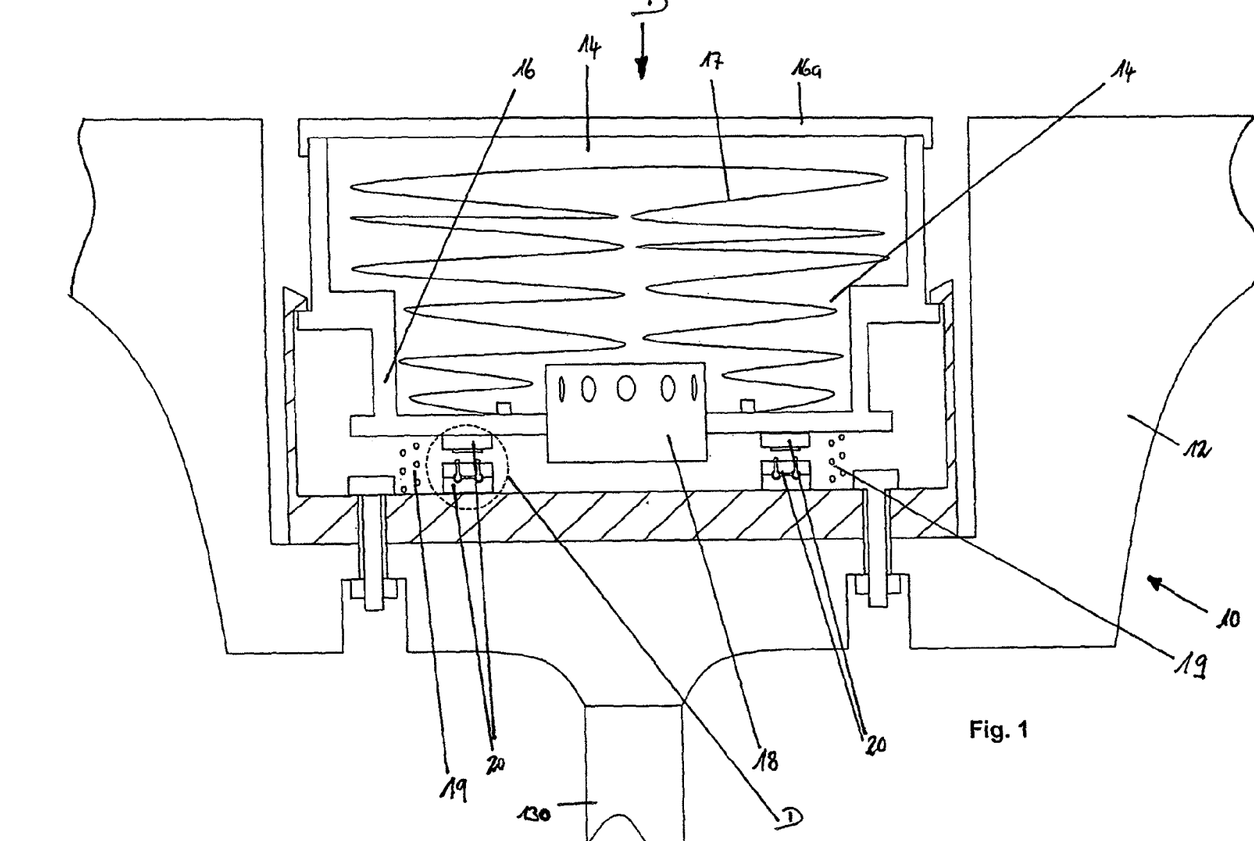
FIG. 1 is a diagrammatic cross-section through a vehicle steering wheel, wherein two horn contacts are illustrated.

FIG. 1 shows diagrammatically a cross-section through the hub region of a vehicle steering wheel 10. The vehicle steering wheel 10 has a steering wheel body 12 and an airbag module 14, which is held in a recess of the steering wheel body 12 situated in the hub region. The airbag module 14 is connected with the steering wheel body 12 by means of helical springs 19 which act as return elements. Positioning means are provided, which define the precise position of the airbag module 14 in the steering wheel body 12. The airbag module 14 consists substantially of a housing 16, an airbag 17 folded into the housing 16, a gas generator 18 and a covering element 16a covering the housing, which covering element also constitutes the actuating surface for the horn in the example embodiment which is shown.

Horn contacts 20 are present, with two horn contacts 20 being illustrated on the basis of the illustration which has been selected; in practice, in most cases three or four horn contacts are present. The design of such a horn contact 20 is now illustrated in further detail, firstly with reference to FIGS. 2, 3 and 3a, wherein FIG. 2 is the detail D of FIG. 1, FIG. 3 is a view from direction A of FIG. 2, and FIG. 3a is a view from direction B of FIG. 3:

The two current-conducting elements which are to come in electrical contact with each other on actuation of the horn so that current flows through them, are two cable cores 44a and 44b which are part of a two-core cable 40 which in addition to the cable cores 44a and 44b also has insulation 42. This insulation also serves to connect the two cable cores 44a, 44b with each other mechanically. The two cable cores 44a and 44b are copper stranded wires. Such a two-core cable 40 is generally very flexible and can be laid easily.

In the region of the horn contact 20, the two-core cable 40 is held in the holding element 32 in a form- and force-fitting manner. In the example embodiment which is shown, the holding element 32 has a first half 32a and a second half 32b, which are connected with each other, for example, screwed, snapped or glued. The surfaces of the two halves 32a and 32b facing each other each have a groove, so that the two-core cable 40, as shown in FIG. 2, is received between the two halves 32a and 32b. The first half 32a has two bores 34 which extend from a surface in the direction of the groove, i.e. in the mounted state in the direction of the two-core cable 40. Here, a first bore 34a leads to the first cable core 44a and a second bore 34b leads to the second cable core 44b. First legs 37a and 37b of contact elements 36a and 36b extends respectively into these bores 34a and 34b, into the respective cable core 44a, with the first legs 38a and 38b of the contact elements 36a and 36b penetrating the insulation 42 of the two-core cable 40. For this reason, the two-core cable 40 does not have to be specially prepared; it makes no difference which position of the two-core cable 40 comes to lie in the holding element 32. The contact elements 36a and 36b are preferably bent sheet metal strips.

Figures 2, 3, 4:
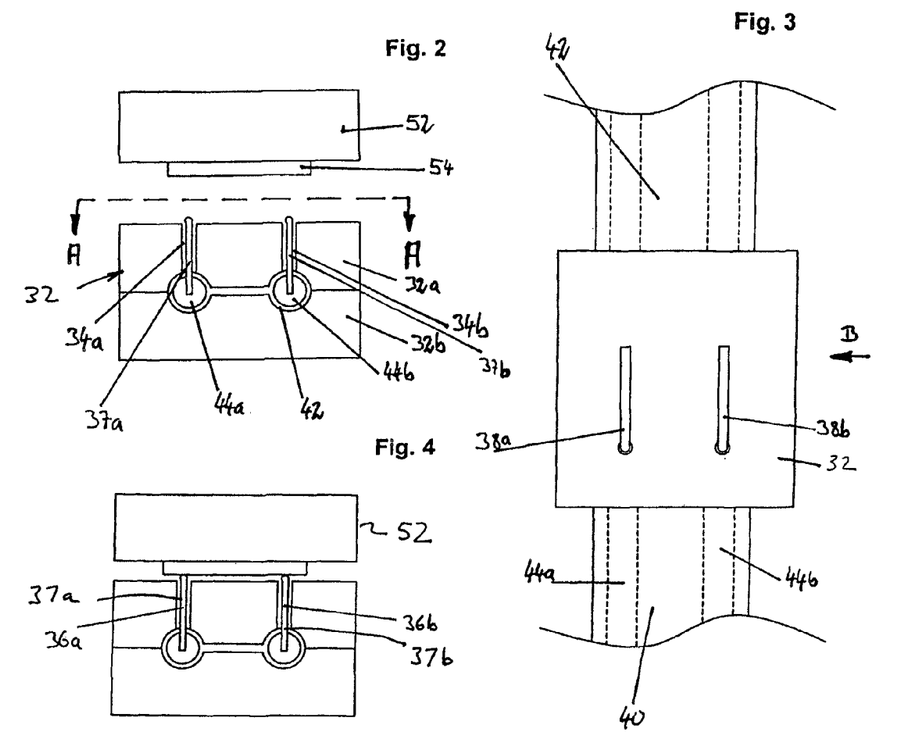
FIG. 2 shows the detail D from FIG. 1.
FIG. 3 is a view from direction A in FIG. 2.
FIG. 4 is an illustration similar to FIG. 2 with an actuated horn.
Figure 3A:
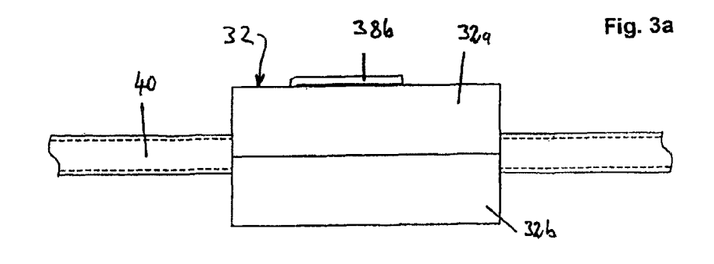
FIG. 3a is an illustration from direction B of FIG. 3.

The second legs 38a and 38b of the contact elements 36a and 36b lie on the upper side of the holding element 32, as can be seen for example from FIGS. 3 and 3a.

Assembly is very simple as follows. After the corresponding section of the two-core cable 40 has been inserted between the two halves 32a and 32b of the holding element 32 and is held thereby in a clamping manner, the two first legs 37a and 37b of the two L-shaped contact elements 36a and 36b are simply inserted into the bores 34a and 34b provided for this, until the second legs 38a and 38b rest on the upper side of the holding element 32, with the pre-fabricated contact elements 36a and 36b being dimensioned so that in this state the first legs 37a and 37b extend into the respective cable cores 44a and 44b. In this state, the two L-shaped contact elements 36a and 36b are additionally fixed, for example glued securely on the holding element 32.

As an alternative to this, the two contact elements 36a and 36b can also be cast into the first half 32a of the holding element 32, so that the ends of the first legs on attaching, or respectively fastening of the first half on the second half penetrate into the corresponding cable cores. Furthermore, it is possible that the two halves 32a and 32b of the holding element are constructed integrally and are connected with each other by means of a film hinge.

In the final installation of the vehicle steering wheel 10, the holding element 32, including the two-core cable extending through the holding element 32, is installed on the steering wheel body, for example screwed (screwing not illustrated), and thus forms a first component of a horn contact. In the example of a floating module steering wheel, which is illustrated here, the second component 50 is situated on the airbag module 14, for example on the base of the housing 16. In the present example embodiment, this second component 50 has an actuating block 52 and an electrical conducting element such as a metal element 54 arranged on the base of the actuating block. If the airbag module 14 is pressed down against the steering wheel body 12 (i.e. if the horn is actuated), then the metal element 54 comes into contact with both legs 38a and 38b of the two contact elements 36a and 36b, and the corresponding electric circuit is closed in that the two cable cores 44a and 44b are connected with each other in a conducting manner (see FIG. 4).

As an alternative to this, the second half 32b of the holding element 32 can also be already rigidly fastened to the steering wheel body, or can be constructed integrally therewith, and the insertion of the two-core cable 40 and the fastening of the first half 32a on the second half 32b takes place on the steering wheel body.

Figure 8:
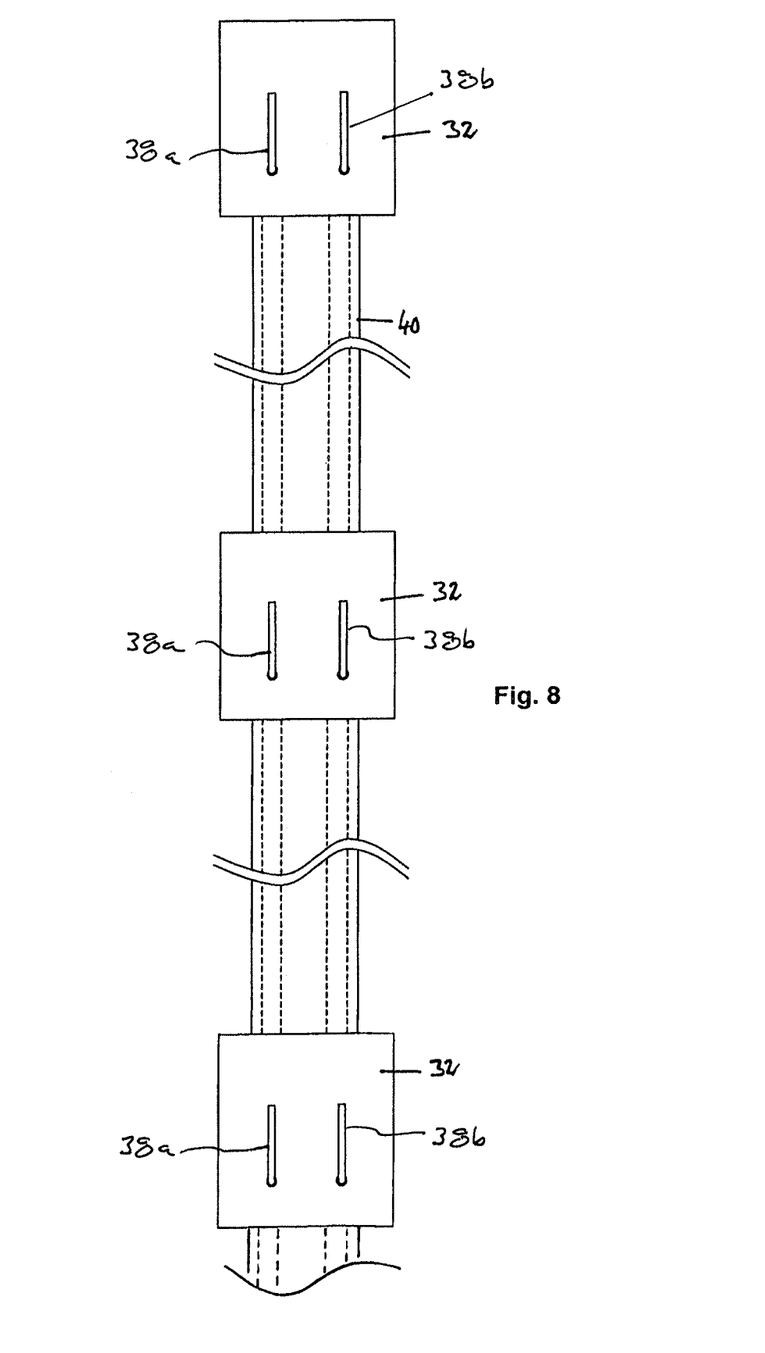
FIG. 8 shows a pre-mounted assembly.

As can be seen from FIG. 8, several (here three) holding elements 32 can be arranged on a single two-core cable 40, so that for all the horn contacts which are provided, only one single two-core cable 40 is required, which owing to its flexibility can be very easily laid on the steering wheel body 12. Also in this case, a pre-assembly outside the steering wheel, or an assembly on the steering wheel is possible.

Instead of providing a two-part holding element 32, it would also be possible to cast around or inject around the two-core cable 40 with a corresponding holding element, so that this would then be constructed in one piece. In this case, a pre-assembly outside the steering wheel is obligatory.

Figures 5, 6, 7:
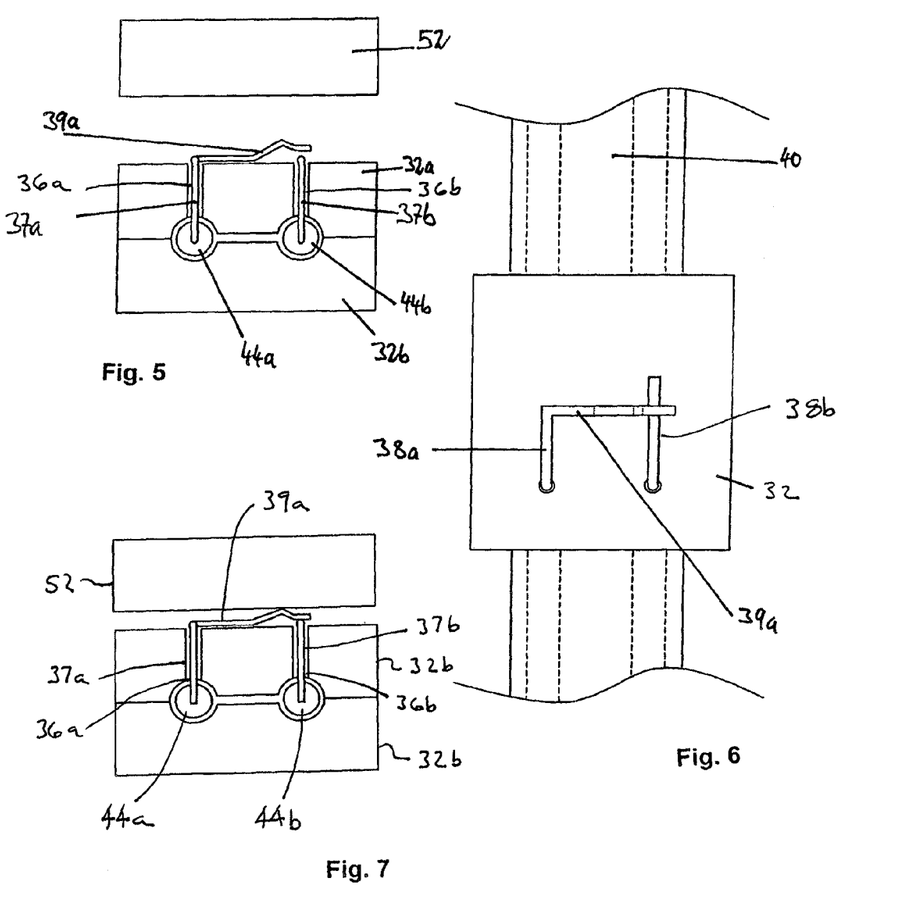
FIG. 5 shows an alternative embodiment of the invention in a representation corresponding to FIG. 2.
FIG. 6 is an illustration in FIG. 5 in a representation corresponding to FIG. 3.
FIG. 7 is an illustration similar to FIG. 5 with an actuated horn.

FIGS. 5 to 7 shows a second example embodiment in illustrations which correspond to FIGS. 2 to 4 of the first example embodiment. The basic structure is identical to that in the first example embodiment, so that this does not have to be described in detail separately. In contrast to the first example embodiment, the first contact element 36a has not two, but three legs 37a, 38a and 39a. As also in the first example embodiment, the first leg 37a extends through the corresponding bore 34 into the first cable core 44a, the second leg 38a extends on the upper side of the holding element 32. In contrast to the first example embodiment, a third leg 39a extends from the second leg 38a in the direction of the second leg 38b of the second contact element 36b, with this third leg 39a being contoured so that it extends over the second leg 38b of the second contact element 36b, but does not touch it in the state which is free of forces (see FIG. 5). By the pressing down of the second component 50, which consists here only of an actuating block 52, the third leg 39a of the first contact element 36a is pressed down onto the second leg 38b of the second contact element 36, whereby the electric circuit is closed. In the state which is free of forces, the third leg 39a then springs again into the position shown in FIG. 5. In such an example embodiment, the first contact element 36a must have corresponding elastic characteristics.

Figure 9:
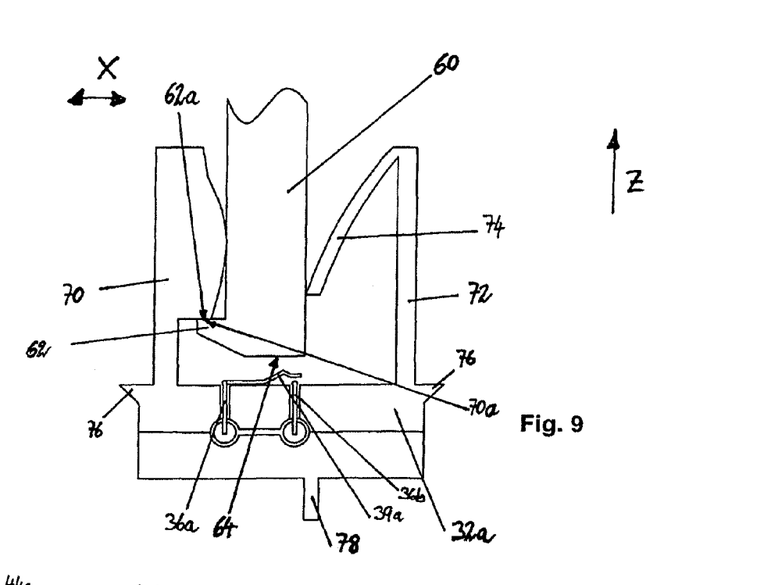
FIG. 9 shows a third embodiment of the invention in a representation corresponding to FIG. 2.

FIG. 9 shows a third example embodiment of the invention. Here, the second component of the horn contact serves for a further purpose, namely for the exact positioning of the airbag module on the steering wheel body. For this, the second component is constructed as a guide bolt 60 with a detent hook 62. This guide bolt 60 is guided in a guideway on the steering wheel side, which is constructed in a U-shape and has a first arm 70, a second arm 72 and an elastic arm 74 extending from the upper end of the second arm 72 into the interior of the U. This elastic arm 74 presses the guide bolt 60 against the first arm 70, so that it positions it at least in the X-direction. The first arm 70 has in addition a shoulder 70*a*, against which the contact surface 62*a* of the detent hook 62 is pressed due to the helical springs 19. Hereby, a positioning takes place in the Z-direction. If three such guideways are provided—and hence three horn contacts —, then the position of the airbag module 14, which is not pressed down, can be determined entirely with respect to the steering wheel body.

In the example embodiment which is shown, the first and second arms 70 and 72 extend from the holding element 32, namely from its first half 32*a*. The holding element 32 therefore also has a dual function, namely as part of the horn contact and as a guideway on the steering wheel side for the positioning of the airbag module 14. Furthermore, the holding element has two detent projections 76, by means of which the holding element can be engaged into a recess of an elastic region (generally formed as foam) of the steering wheel body. An asymmetrically arranged pin 78 prevents a side-inverted installation.

The lower side of the guide pin 60 is constructed as an actuating surface 64, by means of which the third leg 39*a* of the first contact element 36*a* can be pressed onto the second leg of the second contact element 36*b*. A design as in the first example embodiment with an electrical conducting element (for example a metal element) on the actuating surface 64 would likewise be possible.

Figure 10:
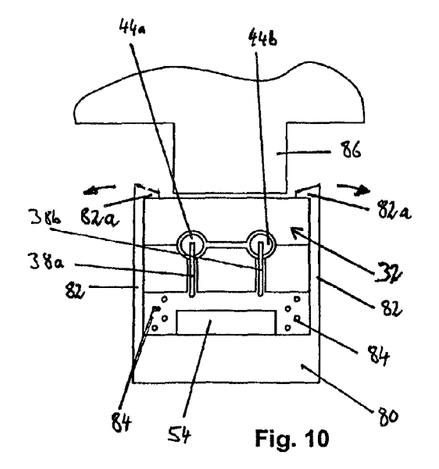
FIG. 10 shows a fourth embodiment of the invention in a representation corresponding to FIG. 2.
Figure 11:
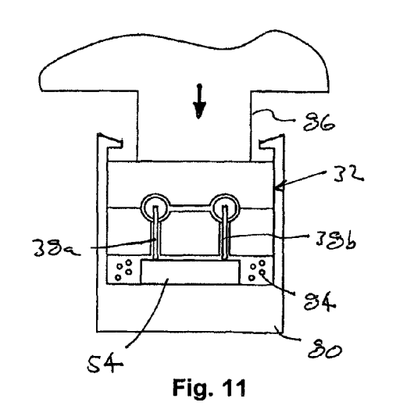
FIG. 11 is an illustration similar to FIG. 10 with an actuated horn.

In the example embodiments shown hitherto, the holding element is rigidly connected with the steering wheel body, which in many cases is also to be preferred. However, this is not obligatory, as can be seen from the fourth example embodiment illustrated in FIGS. 10 and 11. Here, the holding element 32 is held so as to be axially movable on a holding part 80, having two holding arms 82 and being rigidly connected with the steering wheel body. This holding part 80 carries a metal element 54 as electrical conducting element. Guide grooves (not illustrated) are arranged in the holding element 32, which define the non-axial position of the holding element with respect to the holding part. Pressure springs 84 extend between the holding element 32 and holding part 80, which when the horn is not actuated keep the holding element spaced apart from the metal element and press against hook sections 82*a* of the holding arms (FIG. 10). The airbag module 14 has a ram 86, which on pressing down of the airbag module 14 presses onto the holding element 32 and presses the latter onto the metal element 54 (FIG. 11). A design of the holding element 32 as in the second example embodiment is, of course, also possible. The holding arms 82 are elastic in the arrow directions shown in FIG. 10, so that the holding element 32 can be engaged into the arms of the holding part 80, previously mounted on the steering wheel body.

In the fourth example embodiment which is shown, the holding element 32 is held on the holding part 80 so that it can carry out a pure axial movement. As an alternative to this, however, it would also be possible to hold the holding element on the holding part so as to be swivellable about an axis, with this axis being substantially perpendicular to the axial direction, so that a swivelling movement of the holding element has an axial component. In this case it is also to be preferred that the holding element can be snapped onto the holding part—namely on the axis.

Despite the somewhat greater complexity compared with the first two example embodiments, the fourth example embodiment has advantages: It is possible in particular to pre-mount the entire horn contact except for the ram on the airbag module 14 or on the steering wheel body 12. Only the mechanically very non-critical ram remains on the other respective component.

Figure 12:
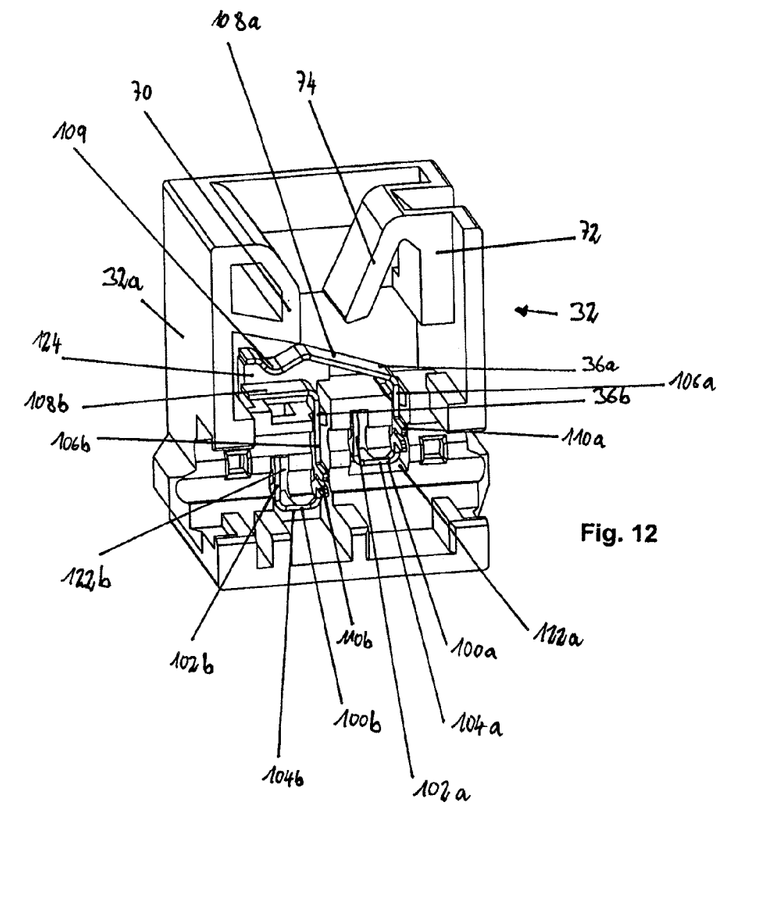
FIG. 12 shows a first half of a holding element of a fifth embodiment with contact elements in a first perspective representation.
Figure 13:
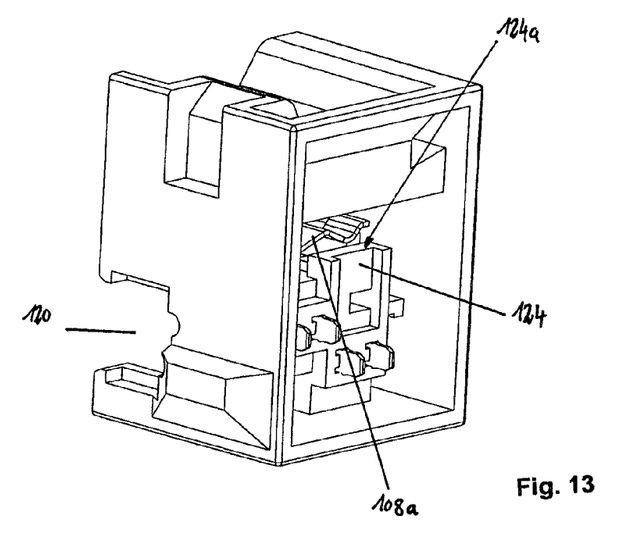
FIG. 13 shows the items shown in FIG. 12 in a second perspective representation.
Figure 14:
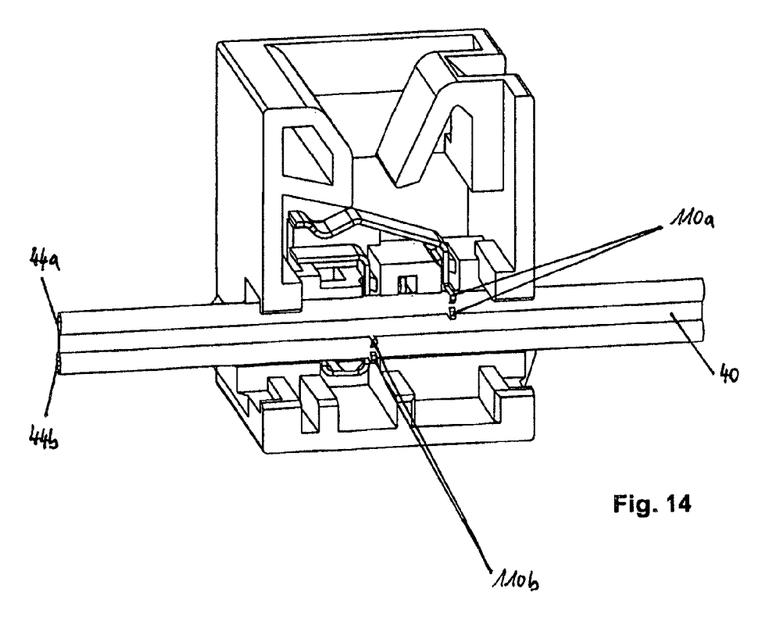
FIG. 14 shows the items shown in FIG. 12 and a two-core cable held in a groove of the first half in a representation according to FIG. 12.
Figure 15:
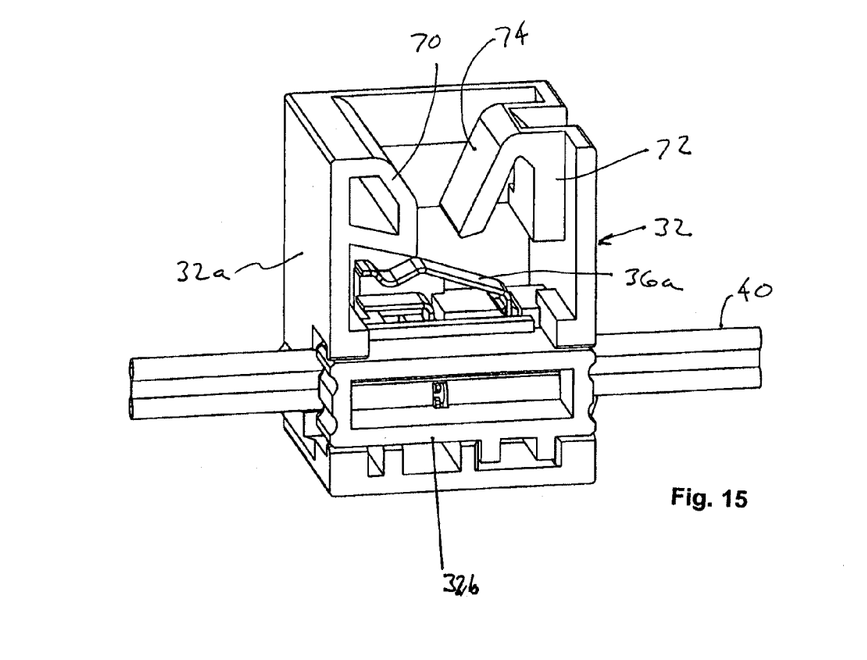
FIG. 15 shows the items shown in FIG. 14 after snapping the second half of the holding element onto the first half.

In FIGS. 12 to 15, a fifth embodiment is shown. In FIG. 12 a first half 32*a* of the holding element 32 with the two contact elements 36*a* and 36*b* is shown in a first perspective view. In FIG. 13 the items of FIG. 12 are shown in a rear perspective view. FIG. 14 is the same view as FIG. 12 after the two-core cable 40 has been installed. FIG. 15 is the same view as FIG. 14 after the second half of the holding element has been snapped onto the first half. The function of this fifth embodiment is similar to the function of the third embodiment shown in FIG. 9. Thus, the horn contact has the additional use, namely to serve for the exact positioning of the gas bag module. For this purpose a first arm 70 and a second arm 72 having an elastic arm 74 are provided like in the third embodiment. These two arms work exactly as described in the third embodiment in connection with a guide bolt having a detent hook (not shown in FIGS. 12 to 15).

The differences to the third embodiment are as follows:

First, the two cable cores 44*a* and 44*b* of the two-core cable 44 do not lie in the same horizontal plane but on top of each other in axial direction of the steering wheel. This axial direction is defined by the steering column 130 shown in FIG. 1 or the parallel pressing-down direction D of the airbag module also shown in FIG. 1. This can be advantageous because this configuration makes the bending of the two-core cable inside the steering wheel body easier.

In order to comply with the vertical positioning of the two cable cores 44*a* and 44*b*, the two contact elements 36*a* and 36*b* have the following shape: Both contact elements 36*a* and 36*b* have a J-shaped strip 100*a* and 100*b* each with a left leg 102*a* and 102*b*, a lower leg 104*a* and 104*b*, a right leg 106*a* and 106*b* and an upper leg 108*a* and 108*b*. All legs of both contact elements 36*a* and 36*b* cut a common vertical plane with the normal directions of the strips being parallel to this vertical plane. The left, lower and right legs are each held in a respective recess 122*a* and 122*b* of the first half 32*a* of the holding element 32. From each right leg 106*a* and 106*b* a U-shaped blade 110*a*, 110*b* extends in horizontal direction into a groove 120 and towards the two-core cable 40 such that the first (upper) cable core 44*a* is partially encompassed by the arms of the U-shaped blade 110*a* of the first contact element 36*a* and that the second (lower) cable core 44*b* is partially encompassed by the arms of the U-shaped blade 110*b* of the second contact element 36*b* (FIG. 14). The two U-shaped blades 110*a* and 110*b* are offset to one another both in vertical as well as in horizontal direction.

The upper leg 108*a* of the J-shaped strip 100*a* of the first contact element 36*a* is manufactured with such a length that extends over the upper leg 108*b* of the J-shaped strip 100*b* of the second contact element 36*b*. The upper leg 108*a* of the first contact element can be pressed down in a resilient manner onto the upper leg 108*b* of second contact element such that the contact between the two contact elements (and thus the two cable cores) is closed. This pressing down is achieved by the (not shown) guide bolt as in the third embodiment.

As can be seen best in FIG. 13, the first half 32*a* of the holding element 32 shows a rigid block 124 next to the upper arms 108*a* and 108*b* of the contact elements. The upper edge 124*a* of this block 124 is located on a lower vertical position as the uppermost point of the upper leg 108*a* of the force-free first contact element. When the upper leg 108*a* of the first contact element 36*a* is pushed down by the guide bolt and both upper legs 108*a* and 108*b* are in good electrical contact, such that the U-shaped front end 109 of the upper leg 108*a* of the first contact 36*a* element is slightly resiliently deformed, the upper edge 124a of the block 124 and the uppermost point of the upper leg of the first contact element are at the same vertical position. The width and position of the guide bolt is such that it reaches over the upper arms 108a as well as over the block 124. If more force is exerted to the guide bolt (during assembly or during actuation of the horn) after reaching this position, the guide bolt is stopped by the block 124 and any additional force is completely led off by the block 124 so that a too strong and possibly irreversible deformation of the upper arm 108a of the first contact element is securely avoided. So, this block 124 serves as a stop.

FIG. 15 shows the finally assembled state. Here, the second half 32b of the holding element is snapped into the groove 120 of the first half and holds the two-core cable in clamped fashion. One can see that the second half 32b of the holding element 32 is clearly smaller that the first half 32a. Despite that the denotation of "halves" is kept in order to have a uniform nomenclature within the description.

In the example embodiments which are shown, the holding elements and the two-core cable 40 are held on the steering wheel body, and the actuating blocks, guide bolts or ram are part of the airbag module. It is, of course, also possible to reverse this arrangement, i.e. to arrange the cable and holding elements on the airbag module.

In order to make the mounting of the two-core cable 40 easier and safer, a guiding ring can be provided in the steering wheel body or on the bottom of the airbag module respectively. This guiding ring can have snap-in parts or groove sections to accommodate sections of the two-core cable.

It is possible to use one core of the two-core cable for grounding the airbag module, respectively the gas generator thereof.

The principle according to the invention can of course also be applied in a "floating cover" construction.

While the above description constitutes the preferred embodiment of the present invention, it will be appreciated that the invention is susceptible to modification, variation, and change without departing from the proper scope and fair meaning of the accompanying claims.

The invention claimed is:

1. A vehicle steering wheel comprising:
a steering wheel body (12), a movable element held movably on the steering wheel body (12) which can be moved by pressing down against a force of a return element against the steering wheel body;
a horn contact (20) which closes an electrical circuit by pressing down of the movable element, the horn contact (20) having first and second cable cores (44a, 44b) which are held in a holding element (32);
first and second contact elements (36a, 36b) extending respectively from each of the first and second cable cores (44a, 44b), the first and second contact elements (36a, 36b) being electrically connected with the respective first and second cable cores, the first and second contact elements (36a, 36b) likewise being held by the holding element (32) coming into electrical contact with each other by pressing down the movable element, one of the first and second contact elements (36a) having a third leg (39a) extending over a second leg (38b) of the other of the first and second contact elements (36b) and, upon pressing down the movable element, coming into direct contact with the second leg (38b) of the other of the first and second contact elements (36b); and
a stop that limits a force that can be exerted to the third leg.

2. The vehicle steering wheel according to claim 1 further comprising that opposite the holding element (32), a second component of the horn contact is provided, which on the pressing down of the movable element, presses on at least one of the first and second contact elements (36a, 36b).

3. The vehicle steering wheel according to claim 2 further comprising that the moveable element is an airbag module and the second component is constructed as a guide bolt (60) which serves for positioning the airbag module (14) with respect to the steering wheel body (12).

4. The vehicle steering wheel according to claim 3 further comprising that the holding element (32) is constructed as a guide for the guide bolt (60).

5. The vehicle steering wheel according to claim 1 further comprising that the first and second cable cores (44a, 44b) are part of a two-core cable (40).

6. The vehicle steering wheel according to claim 5 further comprising that the two-core cable (40) extends through the holding element (32) and at least one further holding element (32).

7. The vehicle steering wheel according to claim 1 further comprising that the first and second cable cores (44a, 44b) are stranded wires.

8. The vehicle steering wheel according to claim 1 further comprising that at least one of the first and second contact elements (36a, 36b) is constructed in an L shape.

9. The vehicle steering wheel according to claim 1 further comprising that the holding element (32) has two halves (32a, 32b).

10. The vehicle steering wheel according to claim 9 further comprising that the first and second contact elements (36a, 36b) are glued to one of the halves (32a) and impressed or cast into one of the halves.

11. The vehicle steering wheel according to claim 9 further comprising that the moveable element is an airbag module and one half (32b) of the holding element (32) is an integral component of the airbag module (14).

12. The vehicle steering wheel according to claim 9 further comprising that one half (32b) of the holding element (32) is an integral component of the steering wheel body (14).

13. The vehicle steering wheel according to claim 1 further comprising that the first and second contact elements (36a, 36b) are mechanically connected in an electrically conducting manner with the first and second cable cores (44a, 44b).

14. The vehicle steering wheel according to claim 1 further comprising that an electrical conducting element (54) is provided, which upon pressing down the movable element, connects the first and second contact elements (36a, 36b) with each other.

15. The vehicle steering wheel according to claim 1 further comprising that the movable element is an airbag module (14) or a part thereof.

16. The vehicle steering wheel according to claim 1 further comprising that the holding element (32) is securely connected with the movable element.

17. The vehicle steering wheel according to claim 1 further comprising that the holding element (32) is securely connected with the steering wheel body (12).

18. The vehicle steering wheel according to claim 1 further comprising that the moveable element is an airbag module and the holding element (32) is held movably on the airbag module (14) by means of a holding part (80).

19. The vehicle steering wheel according to claim 18 further comprising that the holding element (32) is engaged onto the holding part.

20. The vehicle steering wheel according to claim 1 further comprising that the holding element (32) is held movably on the steering wheel body (12) by means of a holding part (80).

21. The vehicle steering wheel according to claim 1 further comprising that at least three of the first and second contact elements (36a, 36b) are present.

22. A vehicle steering wheel comprising:
- a steering wheel body (12), a movable element held movably on the steering wheel body (12) which can be moved by pressing down against a force of a return element against the steering wheel body;
- a horn contact (20) which closes an electrical circuit by pressing down of the movable element, the horn contact (20) having first and second cable cores (44a, 44b) which are held in a holding element (32);

first and second contact elements (36a, 36b) extending respectively from each of the first and second cable cores (44a, 44b), the first and second contact elements (36a, 36b) being electrically connected with the respective first and second cable cores, the first and second contact elements (36a, 36b) likewise being held by the holding element (32) coming into electrical contact with each other by pressing down the movable element, opposite the holding element (32), a second component of the horn contact is provided, which on the pressing down of the movable element, presses on at least one of the first and second contact elements (36a, 36b), the moveable element is an airbag module and the second component is constructed as a guide bolt (60) which serves for the positioning of the airbag module (14) with respect to the steering wheel body (12), the guide bolt (60) has a detent hook (62).

23. A vehicle steering wheel comprising:
- a steering wheel body (12), a movable element held movably on the steering wheel body (12) which can be moved by pressing down against a force of a return element against the steering wheel body;
- a horn contact (20) which closes an electrical circuit by pressing down of the movable element, the horn contact (20) having first and second cable cores (44a, 44b) which are held in a holding element (32), the cable cores (44a, 44b) lying in an axial direction of the steering wheel on top of one another at least in the holding element (32); and
- first and second contact elements (36a, 36b) extending respectively from each of the first and second cable cores (44a, 44b), the first and second contact elements (36a, 36b) being electrically connected with the respective first and second cable cores, the first and second contact elements (36a, 36b) likewise being held by the holding element (32) coming into electrical contact with each other by pressing down the movable element.

24. The vehicle steering wheel according to claim 23 further comprising that a third leg (39a) of one of the first and second contact elements (36a) extends over a second leg (38b) of the other of the first and second contact elements (36b) and on the pressing down of the movable element comes into direct contact with the second leg (38b) of the other of the contact elements (36b).

* * * * *